3,413,317
BICYCLOHEPTANE TRICARBOXYLIC ACIDS, ANHYDRIDES AND ALKYL ESTERS THEREOF
Morris Dunkel, Paramus, N.J., assignor to Universal Oil Products Company, Des Plaines, Ill., a corporation of Delaware
No Drawing. Filed Apr. 25, 1966, Ser. No. 544,692
5 Claims. (Cl. 260—346.3)

ABSTRACT OF THE DISCLOSURE

Tricarboxylic bicyclo-(2.2.1)-heptane compounds exemplified by bicyclo-(2.2.1)-heptane-2,3,5-tricarboxylic acid, 5-carboxy-bicyclo-(2.2.1)-heptane-2, 3-dicarboxylic anhydride, and trialkyl-bicyclo-(2.2.1)-heptane-2,3,5-tricarboxylate.

---

This invention relates to new polycarboxylic compounds and to a method for preparing them. More particularly, this invention is directed to a new class of tricarboxylic bicycloheptane compounds and to a method of preparation therefor.

Polycarboxylic compounds are widely used industrial chemicals having unique utility as components of such valuable materials as polyesters, epoxy curing agents, polyamic acids or polyimides. An object of this invention, therefore, is to provide a new class of polycarboxylic compounds having such valuable utility. Another object of this invention is to provide a novel class of tricarboxylic bicycloheptanes and a method for their preparation.

The tricarboxylic bicycloheptane compounds of this invention have the following general formulae:

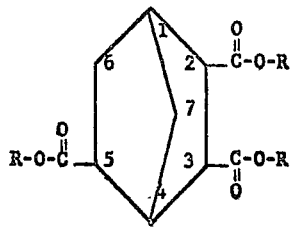    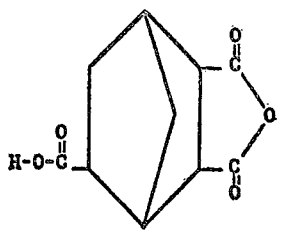

(I)    (II)

wherein R is selected from the group consisting of hydrogen and an alkyl group. Examples of compounds having such formulae include bicyclo-(2.2.1)-heptane-2,3,5-tricarboxylic acid, 5-carboxy-bicyclo-(2.2.1)-heptane-2,3-dicarboxylic anhydride; or trialkyl esters of bicyclo-(2.2.1)-heptane-2,3,5-tricarboxylic acid, preferably having from 1 to 5 carbon atoms per alkyl group, for example, triethyl-bicyclo-(2.2.1)-heptane-2,3,5-tricarboxylate.

The tricarboxylic bicycloheptane compounds having the above Formula I may be prepared, in general, according to the method of this invention by hydrocarboxylating a dicarboxylic bicycloheptene compound with carbon monoxide in the presence of an acid catalyst and either water or an alcohol. The tricarboxylic bicycloheptane compound having the Formula II above may, in general, be prepared according to the method of this invention by dehydrating the compound represented by Formula I. In preparing the tricarboxylic compounds represented by Formula I above, a dicarboxylic bicycloheptene reactant comprising bicyclo - (2.2.1) - 5-heptene-2,3-dicarboxylic acid, the anhydride thereof or a diester thereof which, preferably, is a dialkyl ester having from 1 to about 5 carbon atoms per alkyl group, is reacted with carbon monoxide under hydrocarboxylation conditions in the presence of an acid catalyst and with water to obtain the triacid product or with an alcohol to obtain the triester product. When the bicycloheptene reactant is a diacid or the anhydride thereof, the product obtained may be either a triacid or triester, but when the reactant is a diester the product obtained is usually limited to a triester.

The hydrocarboxylation reaction with carbon monoxide to prepare the triacid or triester represented by Formula I above may be conducted either in the presence of free carbon monoxide or in the presence of a material supplying the carbon monoxide reactant in situ. The latter procedure is the preferred method of this invention and is effected by conducting the reaction in the presence of a material such as a metal carbonyl, for example nickel or cobalt carbonyl, which generates the carbon monoxide reactant in situ. The quantity of the metal carbonyl used in the reaction is not critical and may be widely varied. Generally, however, it is advantageous to use an excess above the stoichiometric level of one mol of carbonyl per four mols of the bicycloheptene reactant and preferably within the range of from about 2 to 4 mols of the carbonyl per mol of the bicycloheptene reactant. One highly suitable catalyst which may be used in the reaction simply comprises the metal portion of the carbonyl admixed with an acid such as acetic acid. Other catalysts may also be used alternatively or in combination therewith and include any of the well known catalysts used in carboxylation reactions including, for example, phosphoric acid, sulfuric acid, boron trifluoride, metallic nickel, cobalt or a metal halide such as aluminum or ferric chloride. The quantity of catalyst used may be widely varied and when the catalyst comprises the metal portion of the carbonyl and an acid such as acetic acid, a quantity of such acid approximately equal in weight to the weight of metal carbonyl is usually satisfactory under most circumstances.

As indicated, when a triester is desired the hydrocarboxylation reaction is effected in the presence of an alcohol, the selection of which will, of course, determine the particular triester obtained. Generally, any alcohol containing from 1 to about 5 carbon atoms per molecule may be used including, for example, methyl, ethyl, butyl or amyl alcohols. The quantity of alcohol used is not important but, generally, the results are improved by using an excess of alcohol of from about 1.5 to 3 mols of alcohol per mol of the bicycloheptene reactant when it is a diester, and from about 4.5 to 9 mols of alcohol per mol of bicycloheptene reactant when it is a diacid or anhydride thereof.

When the triacid is desired, the hydrocarboxylation reaction is effected in the presence of water alone, or with water and either an alcoholic or, more preferably, a non-alcoholic solvent such as dioxane. The quantity of water used is not critical but it should preferably be in excess within the range of from about 1.1 to 2 mols of water per mol of the bicycloheptene reactant when it is a diacid, and from about 3.3 to 12 mols of water per mol of the bicycloheptene reactant when it is an anhydride. Preferably, the triacid is prepared in the presence of a non-alcoholic solvent such as dioxane to avoid any formation of the triester, but an alcohol solvent may be used without substantial triester formation if the water reactant is present in substantial excess over the alcohol.

The conditions used in effecting the hydrocarboxylation reaction may be varied but, due to the highly exothermic nature of the hydrocarboxylation reaction, it is preferred to conduct the reaction at a low temperature within the range of from about 0° to 75° C. and, more preferably, from about 40° to 60° C. and particularly at the refluxing temperature of the reaction mixture at atmospheric pressure. The duration of the reaction may be varied depending upon such factors as the temperature and the degree of mixing but usually a period ranging from about ½ to 10 hours is satisfactory for most reactions.

In the other method of effecting the hydrocarboxylation where free carbon monoxide is used, the reaction is conducted at superatmospheric carbon monoxide pressure and elevated temperature generally ranging from about 2500 to 6000 pounds per square inch at temperatures ranging from about 250° to 350° C. The carbon monoxide is preferably used in slight excess with a ratio of about 1.1 to 2 mols of carbon monoxide per mol of bicycloheptene reactant being suitable under most circumstances. The catalyst used in this method may comprise any of the well known carboxylation catalysts including those illustrated above for the hydrocarboxylation reaction effected in the presence of a metal carbonyl. The quantity of catalyst used may be widely varied but usually a quantity of catalyst ranging from about 0.05 to 30 weight percent of the reaction mixture is suitable for most reactions. The reactants and quantities thereof described above for the preferred hydrocarboxylation method effected in the presence of a metal carbonyl may similarly be used in this method.

The acid-anhydride represented by Formula II above, as indicated, may be prepared by dehydrating the triacid or triester represented by Formula I above. The dehydration may be effected according to any of the well known dehydration procedures such as thermal dehydration or treatment with phosphorous oxychloride, thionyl chloride, phosphorous pentoxide or acetic anhydride. Preferably, the acid-anhydride is prepared using the triacid as the reactant and advantageously such preparation is effected using thionyl chloride. For example, the triacid can be reaction with an excess of the thionyl chloride at the refluxing temperature of the mixture for a period sufficient to complete the reaction. After removal of the excess thionyl chloride by distillation, for example, the reaction mixture may be admixed with water and the desired acid-anhydride product thereafter recovered from the reaction mixture.

The preparation of the compounds represented by Formulae I and II above may be prepared in a batch-, semi-continuous or continuous-type process. For example, in a batch-type process and using a material to supply the carbon monoxide reactant in situ, an appropriate quantity of a metal carbonyl, for example nickel carbonyl, an acid such as acetic acid, water and an alcohol are charged, together with the desired dicarboxylic bicycloheptene reactant under an inert atmosphere such as nitrogen, to a reaction vessel having mixing, heating and cooling means. Extreme caution should be used in conducting the reaction because of the highly poisonous nature of the metal carbonyl. As indicated, if the triester product is desired, the quantity of alcohol present will be adjusted to achieve the desired triester formation. If the triacid is desired, then the quantity of water will be adjusted to achieve the desired triacid formation. If desired, the triacid formation may be advantageously effected in the presence of a non-alcoholic solvent such as dioxane instead of an alcohol. Due to the highly exothermic nature of the reaction, the temperature of the mixture should be gradually raised with mixing the desired range which under atmospheric pressure, usually ranges from about 40° to 60° C. The temperature of the mixture is then maintained thereat for a period sufficient to complete the reaction. The desired products are then isolated and purified according to conventional techniques including, for example, extraction and distillation. When the acid-anhydride product is desired, preferably a triacid prepared as above is charged to a vessel containing excess thionyl chloride maintained under an inert atmosphere. The mixture is stirred and heated to refluxing temperature and maintained thereat until the reaction is complete which is conveniently indicated by a cessation of the evolution of hydrogen chloride and sulfur dioxide. After removing excess thionyl chloride by distillation, the entire reaction mixture may be admixed with water at low temperature. The resulting acid-anhydride product is then isolated and purified by conventional techniques including filtration and crystallization.

The following examples are cited to illustrate the novel class of compounds of this invention and the method of preparation therefor. They are not, however, intended to limit the broad nature of the invention to the specific products and procedures recited therein.

EXAMPLE I

A triester of bicyclo-(2.2.1)-heptane-2,3,5-tricarboxylic acid was prepared as follows:

To a reaction flask equipped with heating/cooling, and mixing means and means for maintaining an atmosphere of nitrogen therein was charged 51.5 grams (0.25 mol) of diethyl bicyclo-(2.2.1)5-heptene-2,3-dicarboxylate, 4.5 milliliters of acetic acid, 4.5 grams of water, 112 grams (2 mols) of ethanol and 12.5 grams (0.1 mol) of nickel carbonyl. Under an atmosphere of nitrogen and with mixing, the colorless solution was heated to about 42° C. whereupon the mixture turned green and after about ½ hour the reaction became highly exothermic. After about 15 minutes an additional 12.5 milliliters of nickel carbonyl (0.1 mol) were added and the temperature was maintained at about 42° C. for about 5.5 hours. The mixture was cooled to 25° C. and 250 milliliters of 2 N sulfuric acid were added and the resulting mixture was extracted three times with 75 milliliters of toluene. The toluene extracts were combined, washed with a sodium chloride solution, washed three times with 25 milliliters of a saturated sodium bicarbonate solution and then with 25 milliliters of a saturated sodium chloride solution. The washed mixture was then dried over sodium sulfate, and after removal of the sulfate by filtration, was stripped of toluene by distillation at 50 mm. Hg pressure up to a temperature of 110° C. About 43.2 grams of product comprising the triethyl ester of bicyclo-(2.2.1)-heptane-2,3,5-tricarboxylic acid was obtained at 0.4 millimeter pressure at a vapor temperature of 153° to 161° C. The product had a saponification value of 99 percent of the theoretical value.

EXAMPLE II

Bicyclo-(2.2.1)-heptane-2,3,5-tricarboxylic acid is prepared as follows:

To a reaction flask equipped with heating/cooling and mixing means and means for maintaining an atmosphere of nitrogen therein are charged 36 grams (0.2 mol) of bicyclo (2.2.1)-5-heptene-2,3-dicarboxylic anhydride, 12 grams (0.6 mol) of water, 16 grams of acetic acid, 105 grams of dioxane and 25 milliliters (0.2 mol) of nickel carbonyl and, with mixing, the solution is heated to about 45° C. An additional 12 milliliters (0.2 mol) of nickel carbonyl are added and the temperature is then maintained at about 45° C. for about 6 hours. The mixture is then cooled to 25° C. and about 250 milliliters of 2 N sulfuric acid are added. The resulting mixture is extracted three times with 75 milliliters of toluene and the toluene extracts are combined and washed with a sodium chloride solution and then distilled at 55 mm. Hg pressure to dryness. The residue is then re-dissolved in 50 milliliters of toluene and then about 250 milliliters of a 4 N sodium hydroxide solution is added and the mixture stirred for about 15 minutes. The resulting aqueous layer is separated, acidified with hydrochloric acid, and then cooled to about 0° C. The solids which form are then separated from the mixture and washed with water to recover the desired product.

EXAMPLE III

5 - carboxylic - bicyclo - (2.2.1)-heptane-2,3-dicarboxylic anhydride is prepared as follows:

To a reaction flask equipped with heating/cooling and mixing means and containing 476 grams (4 mols) of thionyl chloride maintained under an atmosphere of nitrogen are charged 228 grams (1 mol) of bicyclo-(2.2.1)-heptane-2,3,5-tricarboxylic acid. With stirring the mixture is heated to reflux temperature (about 82° C.) and maintained thereat until the evolution of hydrogen chloride and sulfur dioxide ceases. After the excess thionyl chloride has been removed from the mixture by distillation, the entire reaction mixture is slowly charged to about 2 kilos of an ice water mixture and stirred for about 2 hours. The resulting product crystals which form are then separated from the mixture and washed with water and recrystallized to recover the desired product.

I claim as my invention:
1. A tricarboxylic compound having the formulae:

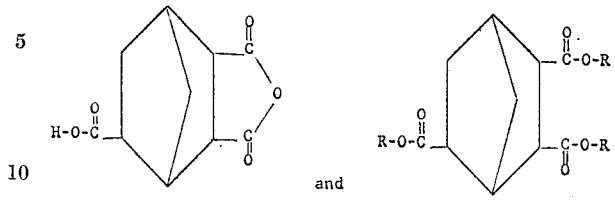

and wherein R is selected from the group consisting of hydrogen and a lower alkyl group.

2. The tricarboxylic compound according to claim 1 which comprises bicyclo-(2.2.1)-heptane-2,3,5-tricarboxylic acid.

3. The tricarboxylic compound according to claim 1 which comprises 5-carboxy-bicyclo-(2.2.1)-heptane-2, 3-dicarboxylic anhydride.

4. The tricarboxylic compound according to claim 1 which comprises trialkyl-bicyclo-(2.2.1)-heptane-2,3,5-tricarboxylate wherein the alkyl groups contain from 1 to about 5 carbon atoms.

5. The tricarboxylic compound according to claim 4 which comprises triethyl-bicyclo-(2.2.1)-heptane-2,3,5-tricarboxylate.

References Cited

UNITED STATES PATENTS 3,326,940   6/1967   Dunkel _____ 260—346.3

OTHER REFERENCES

Reppe et al.: Annalen, vol. 582, pp. 52–57 and 63–64 (1953), QD1L7.

NICHOLAS S. RIZZO, *Primary Examiner.*

B. I. DENTZ, *Assistant Examiner.*